US012801980B2

(12) United States Patent
Phan

(10) Patent No.: US 12,801,980 B2
(45) Date of Patent: Nov. 17, 2026

(54) AUTOMATED DISCOVERY AND DESIGN PROCESS BASED ON BLACK-BOX OPTIMIZATION WITH MIXED INPUTS

(71) Applicant: INTERNATIONAL BUSINESS MACHINES CORPORATION, Armonk, NY (US)

(72) Inventor: Dzung Tien Phan, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 17/834,873

(22) Filed: Jun. 7, 2022

(65) Prior Publication Data

US 2023/0394354 A1 Dec. 7, 2023

(51) Int. Cl.
*G06N 20/00* (2019.01)

(52) U.S. Cl.
CPC .................................... *G06N 20/00* (2019.01)

(58) Field of Classification Search
CPC ....... G06N 3/048; G06N 3/0985; G06N 20/00
See application file for complete search history.

(56) References Cited

U.S. PATENT DOCUMENTS 6,687,887 B1 2/2004 Teig et al.
9,378,733 B1 * 6/2016 Vanhoucke ............. G10L 15/08 702/5
2003/0225718 A1 12/2003 Shmulevich et al.
2013/0035861 A1 * 2/2013 Miller .................... G01C 15/00 702/5
2017/0249547 A1 * 8/2017 Shrikumar ............. G06N 3/045 702/5

(Continued)

FOREIGN PATENT DOCUMENTS

CN 110428876 A 11/2019
CN 113033105 A 6/2021

(Continued)

OTHER PUBLICATIONS

Castillo et al. "Optimal agricultural spreading scheduling through surrogate-based optimization and MINLP models". (Year: 2020).*

(Continued)

*Primary Examiner* — Yuk Ting Choi
(74) *Attorney, Agent, or Firm* — CHIP LAW GROUP

(57) ABSTRACT

A method and system of optimizing a machine learning process includes receiving an input set of historical data including input values and output values. The historical data is incorporated into a sampling design to form the initial dataset. A surrogate model of the machine learning model is generated by fitting the historical data using a rectified linear activation function (ReLU) deep neural network. Mixed-integer linear programming techniques are applied to the surrogate model to arrive at a set of predicted optimal inputs. The machine learning model is tested using the predicted optimal inputs. Output from the testing of the machine learning model is generated using the predicted optimal inputs. A determination from the output is made as to whether an optimal output has been generated by the testing of the machine learning model using the predicted optimal inputs.

14 Claims, 6 Drawing Sheets

(56) References Cited

U.S. PATENT DOCUMENTS

| | | | | |
|---|---|---|---|---|
| 2018/0116600 | A1 | 5/2018 | Basu et al. | |
| 2019/0012611 | A1* | 1/2019 | Matsumura | G06N 20/00 702/5 |
| 2020/0042901 | A1 | 2/2020 | Chen et al. | |
| 2020/0080744 | A1* | 3/2020 | Sohn | F24F 11/47 702/5 |
| 2020/0097853 | A1 | 3/2020 | Golovin et al. | |
| 2020/0210056 | A1 | 7/2020 | Steppan et al. | |
| 2020/0387818 | A1 | 12/2020 | Chan et al. | |
| 2021/0012189 | A1 | 1/2021 | Wang et al. | |
| 2021/0049503 | A1 | 2/2021 | Nourian et al. | |
| 2022/0027757 | A1 | 1/2022 | Phan et al. | |
| 2022/0299952 | A1* | 9/2022 | Salhov | G05B 13/048 707/737 |
| 2023/0015423 | A1* | 1/2023 | Chong | H04L 67/289 702/5 |
| 2023/0185268 | A1* | 6/2023 | Moradian | G05B 19/188 700/121 |
| 2023/0281363 | A1 | 9/2023 | Phan et al. | |
| 2023/0394354 | A1* | 12/2023 | Phan | G06N 20/00 702/5 |

FOREIGN PATENT DOCUMENTS

| | | | |
|---|---|---|---|
| CN | 113128147 | A | 7/2021 |
| JP | 2021-012501 | A | 2/2021 |
| KR | 10-1860258 | B1 | 6/2018 |
| WO | 2020/039121 | A1 | 2/2020 |
| WO | 2021/136932 | A1 | 7/2021 |

OTHER PUBLICATIONS

Leal-Romo, et al., Surrogate-Based Analysis and Design Optimization of Power Delivery Networks, IEEE Transactions on Electromagnetic Compatibility Jun. 2019, 8 pages.

Masood, et al., Machine Learning-Based Surrogate Model for Accelerating Simulation-Driven Optimisation of Hydropower Kaplan Turbine, Renewable Energy, Aug. 2021, vol. 173, pp. 827-848.

Qian , et al., Building Surrogate Models Based on Detailed and Approximate Simulations, Journal of Mechanical Design, Jul. 2006, vol. 128, pp. 668-677.

Rangel-Patino, et al., System Margining Surrogate-Based Optimization in Post-Silicon Validation, IEEE Transactions on Microwave Theory and Techniques, May 2017, 8 pages.

Yu, J., "Machine Health Prognostics Using the Bayesian-Inference-Based Probabilistic Indication and High-Order Particle Filtering Framework." Journal of Sound and Vibration, Dec 8, 2015, vol. 358, pp. 97-110.

Mell, P. et al., "Recommendations of the National Institute of Standards and Technology"; NIST Special Publication 800-145 (2011); 7 pgs.

Hasan, M., "Optimization of Constrained and Multidimensional Black-Box Problems Using Convex Hull Approximation and Single-Dimension Surrogate Model"; AIChE Annual Meeting (2016); 4 pgs.

Bliek, L. et al., "Black-box Mixed-Variable Optimisation Using a Surrogate Model that Satisfies Integer Constraints"; arXiv:2006.04508v2 [cs.LG] (2020), 20 pgs.

Bajaj, et al., "Optimization of Constrained and Multidimensional Black-Box Problems Using Convex Hull Approximation and Single-Dimension Surrogate Model"; AIChE Annual Meeting (2016), Abstract.

List of IBM Patents or Patent Applications Treated as Related, 2 pgs.

Costa, A. et al., "RBFOpt: An Open-Source Library for Black-Box Optimization with Costly Function Evaluations"; Mathematical Programming Computation (2018), vol. 10, pp. 597-629.

Dadkhahi, H. et al., "Combinatorial Black-Box Optimization with Expert Advice"; KDD (2020); pp. 1918-1927.

Nguyen, D. et al., "Bayesian Optimization for Categorical and Category-Specific Continuous Inputs"; arXiv:1911.12473v1 [cs.LG] (2019); 13 pgs.

Wang, J. et al., "Parallel Bayesian Global Optimization of Expensive Functions"; Operations Research; downloaded Sep. 14, 2020 from http://pubsonline.informs.org; 17 pgs.

Baptista et al., "Bayesian Optimization of Combinatorial Structures", Proceedings of the 35th International Conference on Machine Learning, Stockholm, Sweden, PMLR 80, 2018, 10 pages.

Bertsimas et al., "Simulated annealing", Statistical Science, vol. 08, No. 01, 1993, pp. 10-15.

Buhmann, "Radial basis functions", Acta Numerica, 2000, pp. 1-38.

Cantin, "BayesOpt: A Bayesian Optimization Library for Nonlinear Optimization, Experimental Design and Bandits", Journal of Machine Learning Research, vol. 15, 2014, pp. (2014) 3915 3919.

Muller et al., "SO MI: A surrogate model algorithm for computationally expensive nonlinear mixed integer black box global optimization problems", Computers & Operations Research, vol. 40(5), 2013, 78 pages.

Muller et al., "SO-I: A surrogate model algorithm for expensive nonlinear integer programming problems including global optimization applications", Journal of Global Optimization, vol. 59(4), 2013, pp. 865 889.

Ru et al., "Bayesian Optimisation over Multiple Continuous and Categorical Inputs", Proceedings of the 37 th International Conference on Machine Learning, Online, PMLR 119, 2020, 10 pages.

* cited by examiner

AUTOMATED DISCOVERY AND DESIGN PROCESS BASED ON BLACK-BOX OPTIMIZATION WITH MIXED INPUTS

BACKGROUND

Technical Field

The present disclosure generally relates to artificial intelligence, and more particularly, to systems and methods of using automated discovery of compounds or materials and design processes based on black-box optimization with mixed continuous-categorical inputs.

Description of the Related Art

In some areas including materials science and semiconductor engineering using professional knowledge and techniques, engineers discover and find an optimal set of chemical compounds, materials or design a process as recipe sequences for semiconductor ICs. The process of manufacturing a product and measuring its quality can be modeled via a black-box function, where the inputs are the design values and the output is the quality of the resultant compound or material which can be measured.

A well-defined measure of product quality is often available, and the parameters of the product or process design (such as size, shape, and types of materials) may be optimized for the best quality. This process is formulated as black-box optimization. The trial-and-error process of synthesizing many molecules for better material properties can be regarded as a process to search for the optimal solution for a black-box function, where the function describes the relation between a chemical formula and its properties.

SUMMARY

According to an embodiment of the present disclosure, a computer implemented method of optimizing a machine learning process is provided. The method includes receiving an input set of historical data including input values and output values. The historical data is incorporated into a sampling design to form the initial dataset. A surrogate model of the machine learning model is generated by fitting the historical data using a rectified linear activation function (ReLU) deep neural network. Mixed-integer linear programming techniques are applied to the surrogate model to arrive at a set of predicted optimal inputs. The machine learning model is tested using the predicted optimal inputs. Output from the testing of the machine learning model is generated using the predicted optimal inputs. A determination from the output is made as to whether an optimal output has been generated by the testing of the machine learning model using the predicted optimal inputs.

According to another embodiment of the present disclosure, a computer program product for optimizing a machine learning process is provided. The computer program product includes one or more computer readable storage media, and program instructions collectively stored on the one or more computer readable storage media. The program instructions include receiving an input set of historical data including input values and output values. The historical data is incorporated into a sampling design to form the initial dataset. A surrogate model of the machine learning model is generated by fitting the historical data using a rectified linear activation function (ReLU) deep neural network. Mixed-integer linear programming techniques are applied to the surrogate model to arrive at a set of predicted optimal inputs. The machine learning model is tested using the predicted optimal inputs. Output from the testing of the machine learning model is generated using the predicted optimal inputs. A determination from the output is made as to whether an optimal output has been generated by the testing of the machine learning model using the predicted optimal inputs.

According to another embodiment of the present disclosure, a computer server is disclosed. The computer server includes: a network connection; one or more computer readable storage media; a processor coupled to the network connection and coupled to the one or more computer readable storage media; and a computer program product including: program instructions collectively stored on the one or more computer readable storage media, the program instructions include receiving an input set of historical data including input values and output values. The historical data is incorporated into a sampling design to form the initial dataset. A surrogate model of the machine learning model is generated by fitting the historical data using a rectified linear activation function (ReLU) deep neural network. Mixed-integer linear programming techniques are applied to the surrogate model to arrive at a set of predicted optimal inputs. The machine learning model is tested using the predicted optimal inputs. Output from the testing of the machine learning model is generated using the predicted optimal inputs. A determination from the output is made as to whether an optimal output has been generated by the testing of the machine learning model using the predicted optimal inputs.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
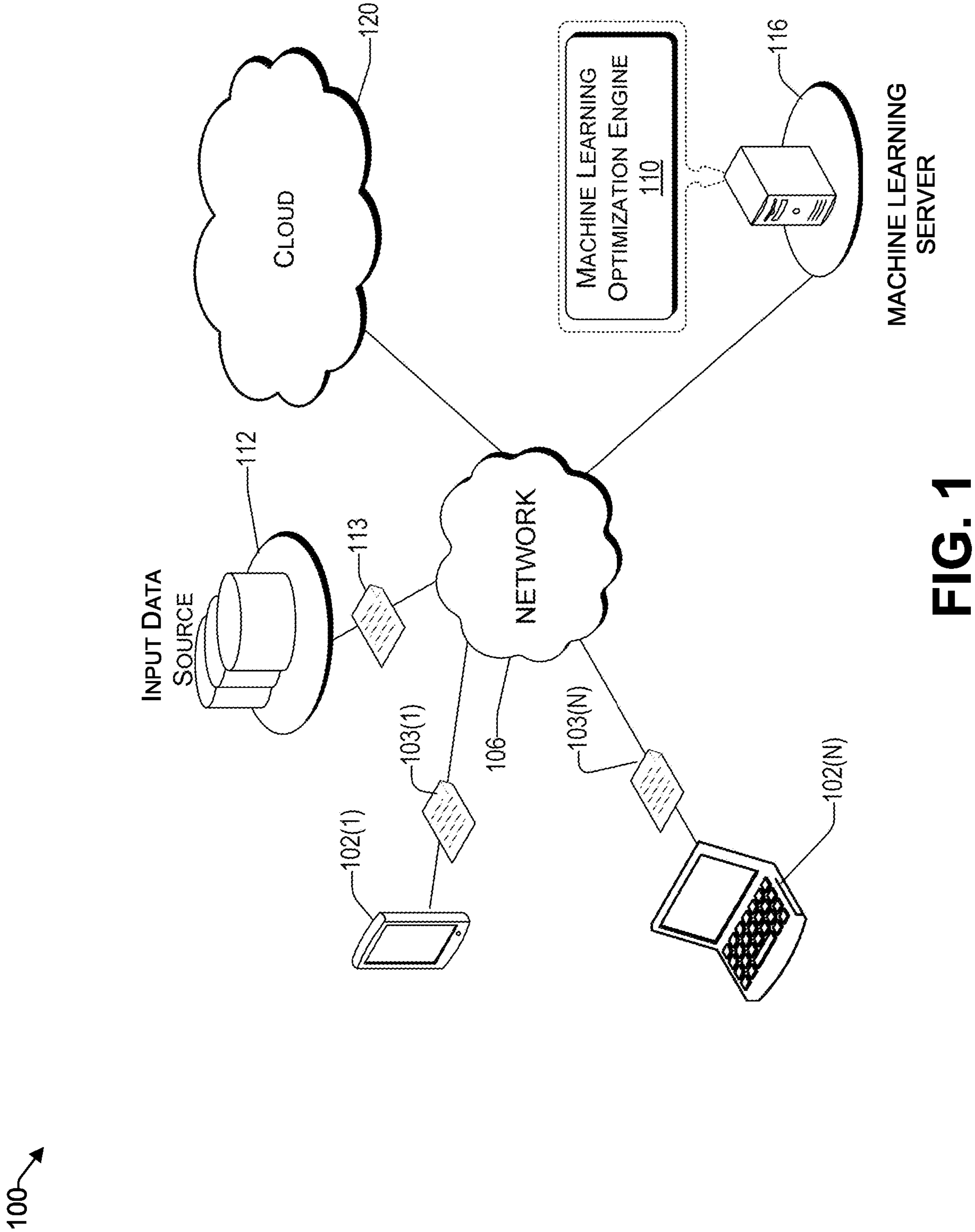
FIG. 1 is a block diagram of an architecture for optimizing a machine learning process according to an embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Overview

The present disclosure generally relates to systems and methods of machine learning. Features in the subject disclosure improve on the efficiency of generating optimal outputs from machine learning processes. Generally, the embodiments may be practiced in the field of machine learning applications and in particular, applications that may benefit from using mixed types of input values.

To better appreciate the features of the present application, it may be helpful to provide an overview of known systems. For a traditional block box optimization process, the evaluation of data is guided by the following:

$$\min_x f(x), f(x) \text{ is a black-box function}$$

$$\text{subject to } 1 \leq x \leq u, x \in \mathbb{R}^n$$

Given x, evaluating $f(x)$ can take many hours and the gradient of $f(x)$ is unavailable. The conventional process includes building a regression function and sampling a new experiment. For this conventional process, the historical dataset does not sufficiently cover the search space for experimental designs, hence the regression function needs to be updated with more sample points in order to improve the prediction accuracy. As can be seen when reviewing the limitations of the functions above, only single classes of categories can be evaluated per experiment. Several new experiments may be required in order to identify an optimal design.

In the subject disclosure, embodiments propose a machine learning process that optimizes the output from a black-box function. In some embodiments, the subject process may automate the discovery of new materials. In another embodiment, process designs may be optimized. For applications that use mixed inputs including continuous, integer and categorical variables, it will be appreciated that aspects of the subject technology consider mixed inputs being simultaneously in the black-box function. Aspects of the subject disclosure provide improvements to computing technology. It would be unfeasible for a human to perform the functionality described herein because the inner workings of a black box system are unknown to the observing user. The manpower that would be required to replicate the computations performed in the machine learning process through the conventional trial error approach to optimization, and the time involved to receive results that could be verified, would likely be impractical (years if not lifetimes). Typically resource expensive and complex parameters may now be evaluated with lower computing time and power required than conventional approaches that are limited to single parameter evaluation per experiment. For example, experiments evaluating potential process designs or materials discovery may be performed that output an increasingly more accurate optimal result after each test iteration using less experiment runs than conventional methods. In some aspects, the subject methods are overtly improved over conventional machine learning processes because mixed categories of variables for continuous input values can be evaluated in a single evaluation run thereby improving the performance of the computing platform configured to perform the evaluation. In addition, even more complex experiments are available because, in some embodiments, it allows users to select side constraints with domain knowledge that are considered in an experiment run.

Example Architecture

FIG. 1 illustrates an example architecture 100 for optimizing a machine learning process. Architecture 100 includes a network 106 that allows various computing devices 102(1) to 102(N) to communicate with each other, as well as other elements that are connected to the network 106, such as a data input source 112, a machine learning server 116, and the cloud 120.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. The network 106 allows the machine learning optimization engine 110, which is a software program running on the machine learning server 116, to communicate with the data input source 112, computing devices 102(1) to 102(N), and the cloud 120, to provide data processing. The data input source 112 may provide data 113 that will be processed under one or more techniques described here. The input data may include different prediction model variables. The input data 113 values may be of mixed type data. Examples of different variable types include continuous, integers, categorical, and mixed values. Some of the data may include user defined constraints to be considered in the modeling process. The data processing may be one or more user specified tasks including for example, feature learning, classification, materials discovery, and process design. In one embodiment, the data processing is performed at least in part on the cloud 120.

For purposes of later discussion, several user devices appear in the drawing, to represent some examples of the computing devices that may be the source of data being analyzed depending on the task chosen. Aspects of the symbolic sequence data (e.g., 103(1) and 103(N)) may be communicated over the network 106 with the machine learning optimization engine 110 of the machine learning server 116. Today, user devices typically take the form of portable handsets, smart-phones, tablet computers, personal digital assistants (PDAs), and smart watches, although they may be implemented in other form factors, including consumer, and business electronic devices.

For example, a computing device (e.g., 102(N)) may send a request 103(N) to the machine learning optimization engine 110 to determine an optimal output based on the input data stored in the computing device 102(N).

While the data input source 112 and the machine learning optimization engine 110 are illustrated by way of example to be on different platforms, it will be understood that in various embodiments, the data input source 112 and the machine learning server 116 may be combined. In other embodiments, these computing platforms may be implemented by virtual computing devices in the form of virtual machines or software containers that are hosted in a cloud 120, thereby providing an elastic architecture for processing and storage.

Example Methodology

Figure 2:
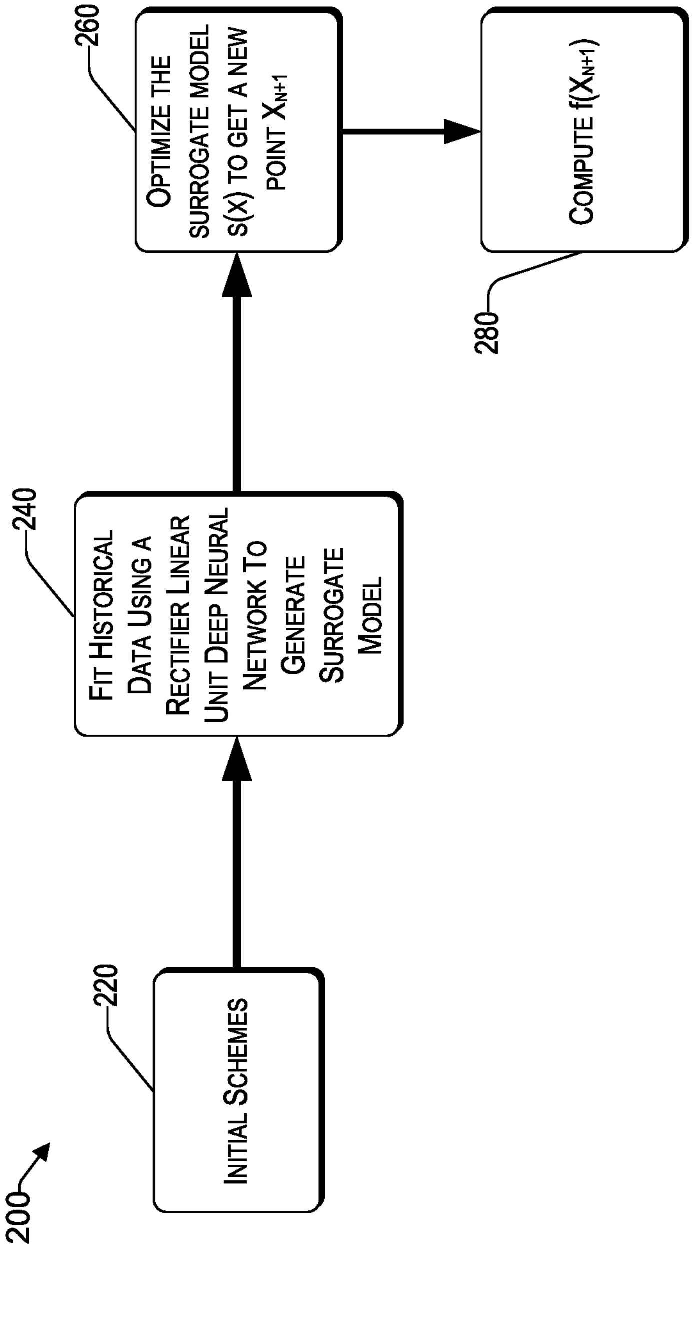
FIG. 2 is a flowchart for a method of optimizing machine learning output according to an embodiment.

Reference now is made to FIG. 2, which is a method 200 for optimizing machine learning output according to an embodiment. As will be appreciated, aspects of the subject method 200 are able to provide solutions using a mathematical model in the black-box function of a machine learning process that complies with the following constraints:

$$\min_{x,y,z} f(x,y,z)$$

$$\text{subject to } l \leq A_z x + B_z y \leq \bar{u}$$

$x \in \mathbb{R}^n$, y is integer $\in \mathbb{Z}^m$, z is categorical

The method 200 includes setting up initial schemes ($\{(X_1, f(X_1)), \ldots, (X_n, f(X_n)\}$) of a machine learning model for determining an output value. The initial scheme designs may be user selected or retrieved from a stored file that the computer system selects. If there are enough historical designs, for example the number of historical designs>10, a machine learning model may be built using these initial designs. But if the number of historical designs is too small, (for example, two historical designs), more initial designs may need to be collected. in order to start building a machine learning model. For a computer selected implementation, a Latin hypercube sampling method may be used to collect more initial designs. The initial schemes 220 may use historical data. Some embodiments incorporate the historical data into sampling designs to collect more initial designs if the number of designs in historical data is small, e.g., less than 10 designs in the historical data. An example of a sampling design is a Latin hypercube sampling method. In some embodiments, real values for integers y and categorical values z may be rounded to the nearest integer and nearest categorical level, respectively.

The machine learning optimization engine 110 may fit 240 the historical data ($D=\{(X_1, f(X_1)), \ldots, (X_n, f(X_n)\}$) using a rectifier linear unit deep (ReLU) neural network to generate a surrogate model ($y=s(x)$) of the machine learning process. For training the neural network, the function values $f(X_k)$ for the historical data may be normalized by dividing $\max_k\{|f(x_k)|, 1\}$, and continuous feature values $$x_i^j$$

by dividing $$\max_j\{|x_i^j|, 1\}.$$

In some embodiments, the machine learning optimization engine 110 may select a feedforward deep neural network with softplus activation function $\sigma(x)=\ln(1+e^{\wedge}kx)/k$ and an adaptive network size of the ReLu network. Initially, a small size of neural network (e.g., the number of neurons and layers are small) can be used, when the number of historical data is large, the size of network can be increased. The machine learning optimization engine 110 may learn the smoothing function for the deep neural network by using a second-order optimization method (for example, an interior-point method) starting from uniformly distributed random weights between [−1,1]. The machine learning optimization engine 110 may use the previous solution determined from the smoothing solution as an initial point for a ReLU based deep neural network with a first-order algorithm (for example, a stochastic gradient descent).

Building the Surrogate Model

The following description is provided as an illustrative example of generating a surrogate model. Assuming a deep neural network of K+1 layers, indexed from 0 to K, which is used to model a nonlinear function $f(x)$: $\mathbb{R}^{n0} \rightarrow \mathbb{R}^{nk}$ with $nK=1$. For each hidden layer $1 \leq k \leq K-1$, the output vector $x_k$ is computed as $x_k=\sigma(W_k x_{k-1}+b_k)$, where $\sigma$ is an activation function and the weights and biases are $$W_k \in \mathbb{R}^{nk \times nk-1}, b_k \in \mathbb{R}^{nk}.$$

A deep neural network is trained for data $$(x^i, y^i)_{i=1}^N$$

for some $t \geq 1$.

$$\min_{W_k,\, b_k} \sum\nolimits_{i=1}^{N} \left(W_k x_{K-1}^i + b_k - y^i\right)^2 \quad \text{eq(1)}$$

$$t * x_k^i = \ln\left(1 + \exp^{t*}\left(W_k x_{K-1}^i + b_k\right)\right)$$

$$x_0^i = x^i,\ i = 1, \ldots, N$$

A second-order optimization algorithm may be used (for example, an interior-point method) to train the softplus activation function neural network equation 1 starting from uniformly distributed random weights between [−1,1]. Using the solution of equation 1, the following model may be trained by stochastic gradient descent.

$$\min_{W_k,b_k} \sum_{i=1}^{N} W_K\Big(\Big(ReLU\Big(ReLU\Big(\ldots\Big(ReLU\Big(ReLU\big(W_1 x^i + b_1\big) + b_2\Big) \ldots + b_{K-1}\Big) + b_K\Big) - y^i\Big)^2 \quad \text{eq(2)}$$

Optimizing the Surrogate Model

The following description is provided as an illustrative example of optimizing the surrogate model generated above with considering model prediction uncertainty and incorporating domain knowledge with side constraints. Assuming a deep neural network of K+1 layers, indexed from 0 to K, which is used to model a nonlinear function $f(x)$: $\mathbb{R}^{n0} \rightarrow \mathbb{R}^{nK}$ with $nK=1$. For each hidden layer $1 \leq k \leq K-1$, the output vector $x_k$ is computed as $x_k=\sigma(W_k x_{k-1}+b_k)$, where $\sigma$ is the ReLu function, and $W_k \in \mathbb{R}^{nk \times nk-1}$, $b_k \in \mathbb{R}^{nk}$.

For each layer k, assume there exist $L_k, U_k \in \mathbb{R}$ such that $L_k, e_k \leq W_k X_{k-1} + b_k \leq U_k$, $e_k=(1, \ldots, 1) \in \mathbb{R}^{nk}$. Assume that $$\{\hat{x}\}_{j=1}^N$$

are historical sampled points. min_d and max_d are minimal and maximum distances for a new sample. A mixed-integer linear programming model for the deep neural network is:

$$\min_{x_k,s_k,z_k,u,v} W_{KXK-1} + b_K \quad \text{eq (3)}$$

$$x_k - s_k = W_k x_{k-1} + b_k,\ k = 1, \ldots, K-1$$

$$x_k, s_k \geq 0,\ k = 1, \ldots, K-1$$

$$z_k \in \{0, 1\}_k^n,\ k = 1, \ldots, K-1$$

$$x_k \leq U_k, z_k,\ k = 1, \ldots, K-1$$

$$s_k \leq -L_k(1 - z_k),\ k = 1, \ldots, K-1$$

-continued $$x_{0,i} - \hat{x}_{i,j} + C * u_{i,j} \geq v_{i,j},\ i = 1, \ldots, n_{0,j} = 1, \ldots, N$$

$$x_{0,i} - \hat{x}_{i,j} + C * u_{i,j} \leq C - v_{i,j},\ i = 1, \ldots, n_{0,j} = 1, \ldots, N$$

$$\sum_{i=1}^{n0} vi,\ j \geq \min\ \_\mathrm{d},\ i = 1, \ldots\ n_0$$

$$\min_{j=1,\ldots\ N} \sum_{i=1}^{n0} vi,\ j \geq \min\ \_\mathrm{d},\ i = 1, \ldots\ n_0$$

$$v \geq 0, \epsilon \{0, 1\}$$

where four new variable are introduced: $S_k \in \mathbb{R}^{nk}$, $z^k \in \{0, 1\}^{nk}$, $v \geq 0$, $u \in \{0, 1\}$. Existing linear and bound constraints are added to the model. A linear side constraints with domain knowledge may be included in equation 3.

Figure 3:
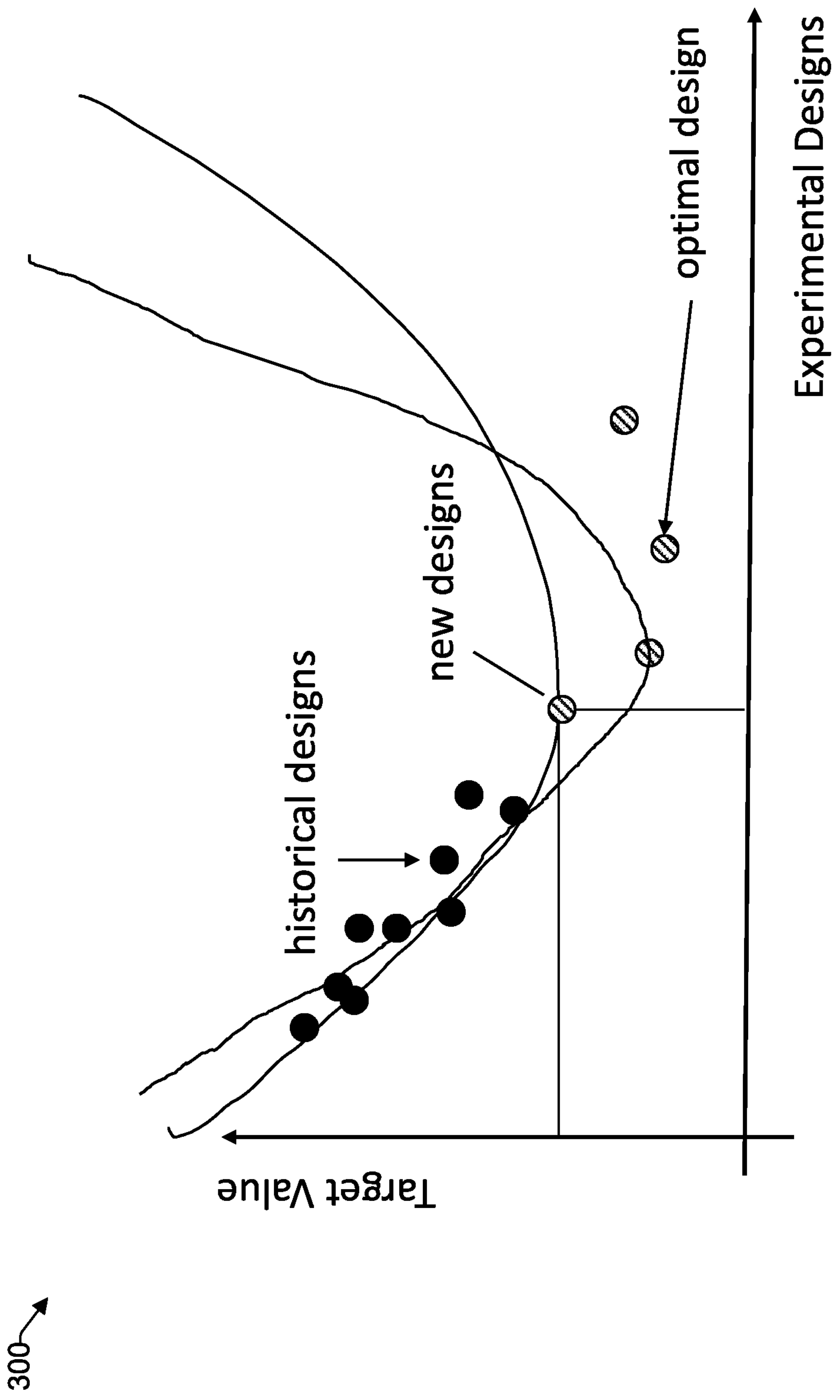
FIG. 3 is a functional block diagram illustration of a computer hardware platform that can communicate with various networked components.

The machine learning optimization engine 110 may optimize 260 the surrogate model s(x) to determine a new point $X_{n+1}$. Referring temporarily to FIG. 3, a plot 300 is shown that depicts a relative performance of conventional machine learning model designs to machine learning model designs of the subject disclosure. The conventional designs are labeled as "historical" and are represented by circles filled with a solid pattern. Machine learning model designs of the subject disclosure are labeled as "new" and are represented by cross-hatched filled patterns. An "optimized" output value in the context discussed may be the lowest function value (f(X,k) for an output generating the most experimental designs. In some embodiments, a new "optimized" or "optimal" output may be found or updated after one or more iterations of the optimization step are performed and an improved value is generated by the method. To optimize the surrogate model, the machine learning optimization engine 110 may generate a mixed-integer linear program. The machine learning optimization engine 110 may add constraints with domain knowledge to the mixed-integer program to decrease the number of trial designs. For example, constraints may be added that are based on distance from a historical data point. The distance constraints may include values that are not too far from and/or not too close to the historical data point. Constraints may include linear side constraints in the feasible set of variables. For example, side constraints may include some physics-based laws for designs variables. With constraints considered in the model, the machine learning optimization engine 110 find the global optimum with the mixed-integer linear program. The machine learning optimization engine 110 may test the machine learning process using the predicted optimal input value(s) found. New data may be generated 280 from the testing of the machine learning process. The machine learning optimization engine 110 may determine from the new data whether an optimal output has been generated.

Illustrative Applications

As will be appreciated, several applications may receive the benefit of optimization using the processes disclosed herein. The output generated by the machine learning model may be for example, the discovery of a new chemical compound, a materials design, a fabrication design, a hyper-parameter tuning for a neural network, or a process design for a semiconductor device. For example, Magnetoresistive random-access memory (MRAM) is a type of semi-conductor device whose process design may be optimized using the disclosed. processes. The fabrication of MRAM devices requires optimization of a ~50 layer stack, with options for each layer. A multitude of experiments can be performed and multiple quality objectives may tracked (since some measurements are noisy). The disclosed processes may guide future experiments and provide optimized solutions even when given an increasingly complex set of structure and material choices for the device. In another example, the hyper-parameter tuning for a neural network may also use mixed category inputs and continuous values whose optimized output may be guided according to the following equation:

$$\lambda^{*} = \operatorname{argmin} L(f(X\_\mathrm{train};\lambda), X\_val) : \lambda \in \Lambda.$$

For fabrication design, a solar cell may be optimized for light scattering to increases the efficiency in capturing photons by maximizing the light absorption co-efficient. The disclosed processes may discover quasi-random structures for scalable fabrication that optimize light scattering incident on the device.

Example Computer Platform

Figure 4:
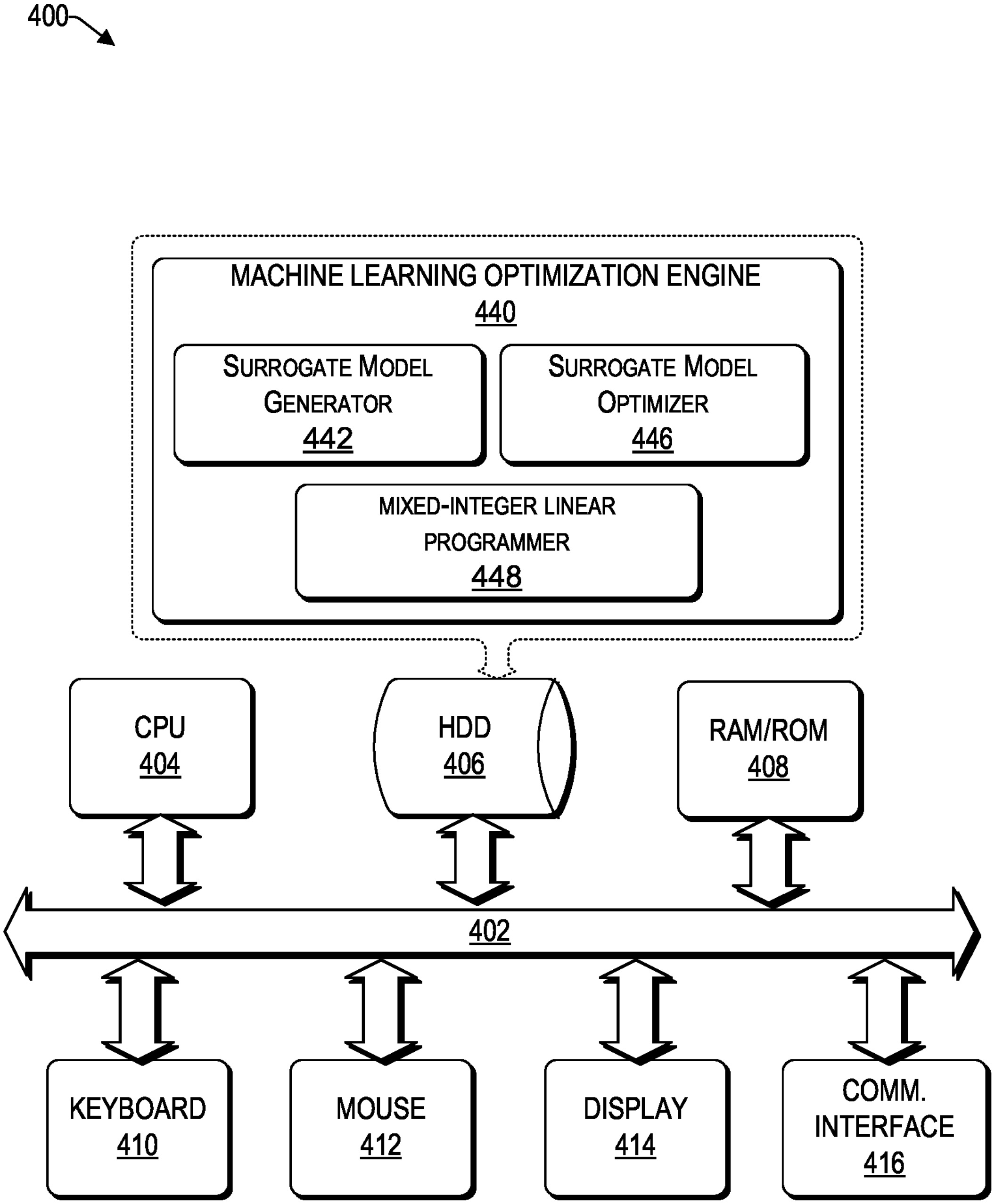
FIG. 4 depicts a cloud computing environment, consistent with an illustrative embodiment.

As discussed above, functions relating to interpretable modeling of the subject disclosure can be performed with the use of one or more computing devices connected for data communication via wireless or wired communication, as shown in FIG. 1. FIG. 4 is a functional block diagram illustration of a particularly configured computer hardware platform that can communicate with various networked components, such as a training input data source, the cloud, etc. In particular, FIG. 4 illustrates a network or host computer platform 400, as may be used to implement a server, such as the machine learning optimization server 116 of FIG. 1.

The computer platform 400 may include a central processing unit (CPU) 404, a hard disk drive (HDD) 406, random access memory (RAM) and/or read only memory (ROM) 408, a keyboard 410, a mouse 412, a display 414, and a communication interface 416, which are connected to a system bus 402.

In one embodiment, the HDD 406, has capabilities that include storing a program that can execute various processes, such as the machine learning optimization engine 440, in a manner described herein. Generally, the machine learning optimization engine 440 may be configured to operate a deep neural network under the embodiments described above. The machine learning optimization engine 440 may have various modules configured to perform different functions. For example, there may be a surrogate model generator 442 that is operative to generate surrogate models as described above with respect to FIG. 2. The machine learning optimization engine 440 may include a surrogate model optimizer engine 446 configured to optimize surrogate models generated by the surrogate model generator 442. Optimization may be performed per the description disclosed in FIG. 2. The machine learning optimization engine 440 may include a mixed-integer linear programmer module 448.

Example Cloud Platform

As discussed above, functions relating to optimizing the output from a machine learning process, may include a cloud 120 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
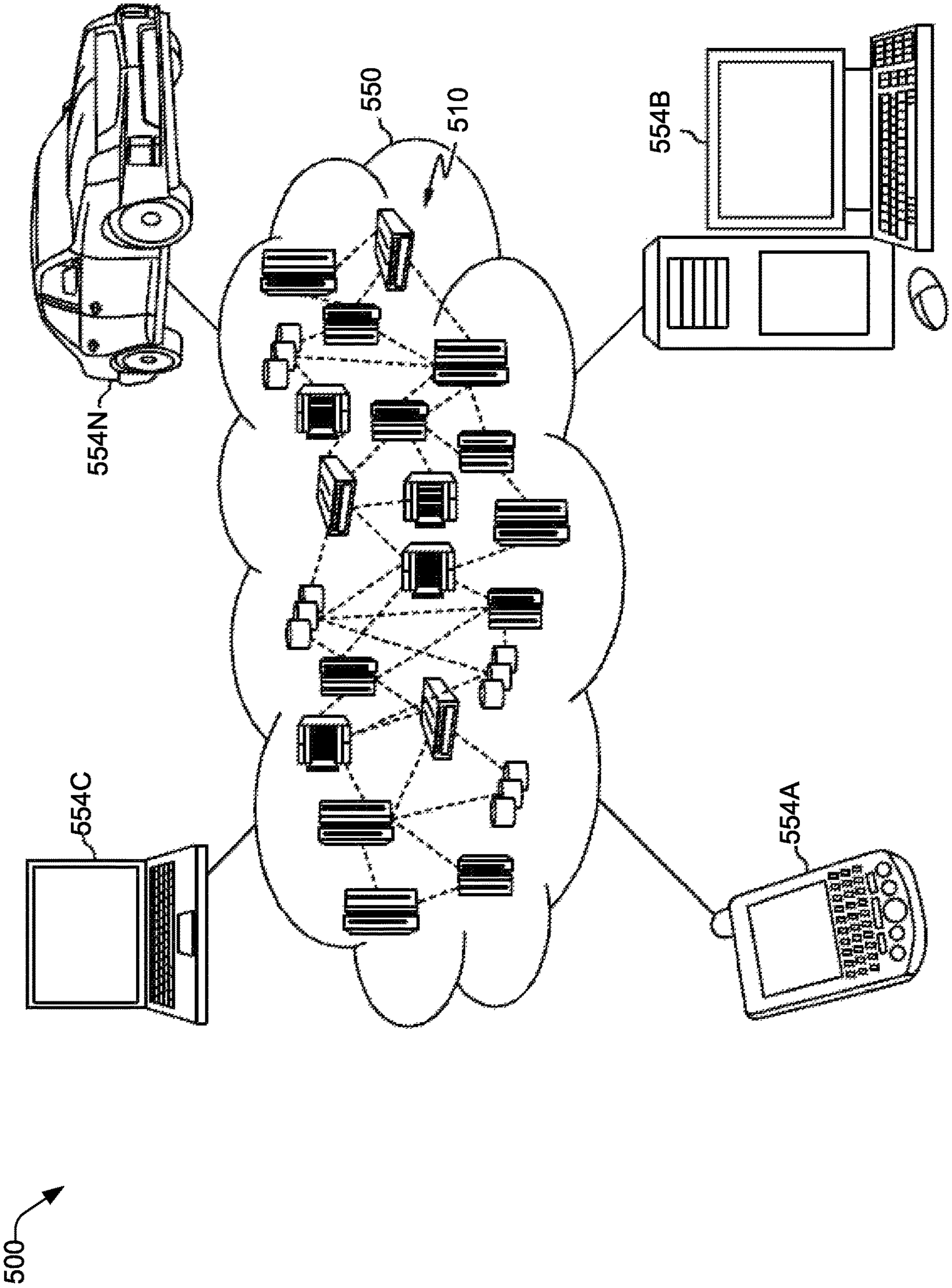
FIG. 5 depicts abstraction model layers, consistent with an illustrative embodiment.

Referring now to FIG. 5, an illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
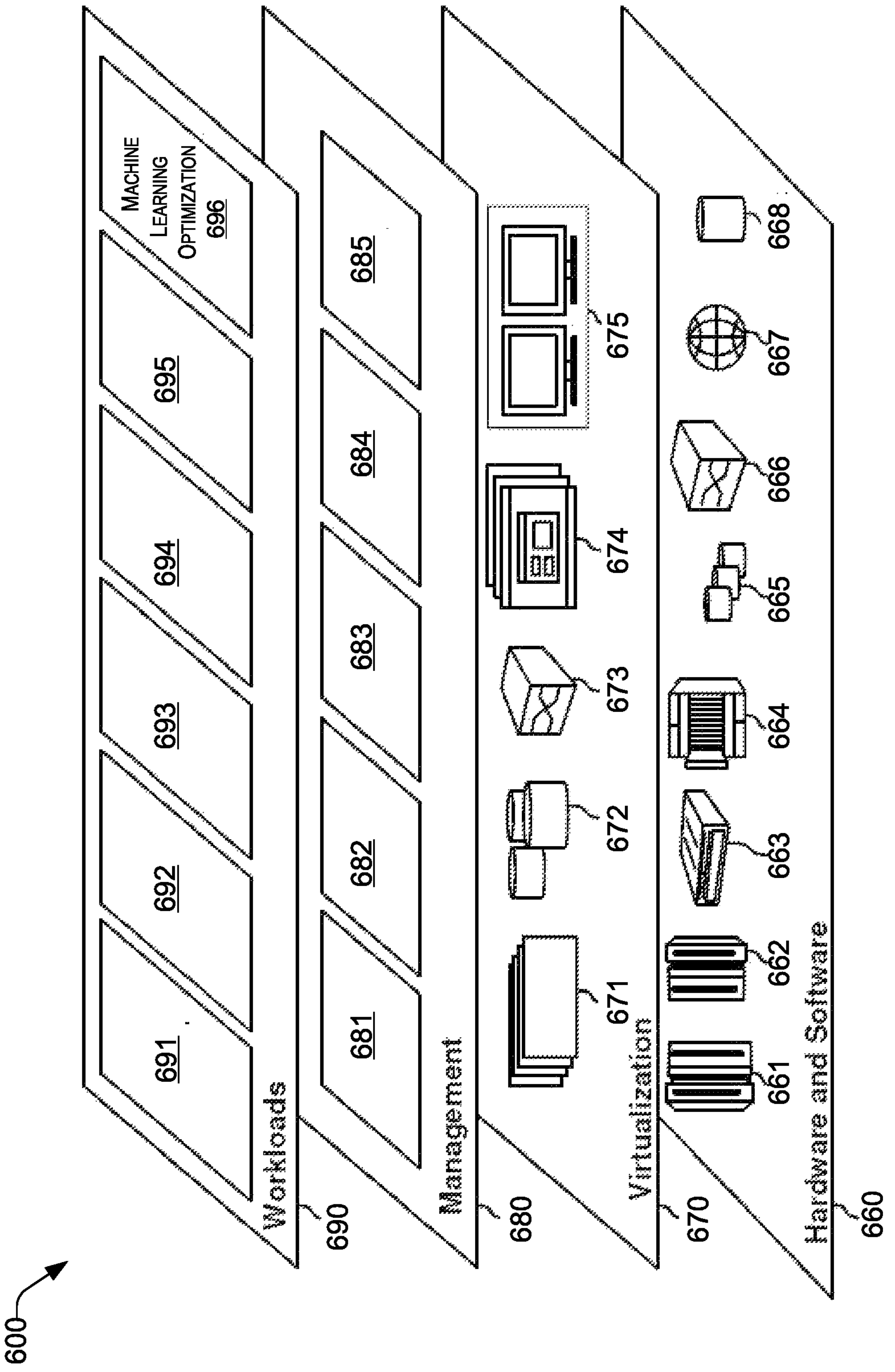
FIG. 6 depicts set of functional abstraction layers provided by cloud computing environment, consistent with an illustrative embodiment.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and machine learning optimization 696, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method, comprising:

receiving historical data including a first set of input values and a first set of output values;

incorporating the received historical data into a sampling design to form an initial dataset comprising function values and continuous values;

normalizing the initial dataset;

training, based on the normalized initial dataset, a feed-forward deep neural network with a softplus activation function to determine a solution point;

training a rectified linear activation function (ReLU) deep neural network using the determined solution point as an initial point;

generating a surrogate model of a machine learning model based on the training of the ReLU deep neural network;

applying one or more mixed-integer linear programming techniques to the surrogate model such that a second set of predicted input values is determined, the mixed-integer linear programming techniques including domain knowledge-based constraints;

testing the machine learning model, from which the surrogate model is generated, using the second set of predicted input values as input to the machine learning model such that, in response, the machine learning model generates a second set of output values, wherein the testing of the machine learning model comprises determining whether an output value, among the second set of output values, has been generated, and the output value is based on an undefined black-box function of the first set of input values; and testing a sample that incorporates the second set of output values.

2. The computer-implemented method of claim 1, wherein the first set of input values includes user defined constraints as side constraints.

3. The computer-implemented method of claim 1, wherein the first set of input values is selected from the group consisting of continuous values, integer values, and categorical values.

4. The computer-implemented method of claim 3, further comprising converting the first set of input values to the integer values and setting the categorical values to integer levels.

5. The computer-implemented method of claim 1, wherein the output value is a discovery selected from the group consisting of a new chemical compound, a materials design, a fabrication design, a hyper-parameter tuning for a neural network, and a process design for a semiconductor device.

6. A computer program product, comprising:

one or more non-transitory computer readable storage media, and program instructions collectively stored on the one or more non-transitory computer readable storage media, the program instructions comprising:

receiving historical data including a first set of input values and a first set of output values;

incorporating the received historical data into a sampling design to form an initial dataset comprising function values and continuous values;

normalizing the initial dataset;

training, based on the normalized initial dataset, a feed-forward deep neural network with a softplus activation function to determine a solution point;

training a rectified linear activation function (ReLU) deep neural network using the determined solution point as an initial point;

generating a surrogate model of a machine learning model based on the training of the ReLU deep neural network;

applying one or more mixed-integer linear programming techniques to the surrogate model such that a second set of predicted input values is determined, the mixed-integer linear programming techniques including domain knowledge-based constraints;

testing the machine learning model, from which the surrogate model is generated, using the second set of predicted input values as input to the machine learning model such that, in response, the machine learning model generates a second set of output values, wherein the testing of the machine learning model comprises determining whether an output value, among the second set of output values, has been generated, and the output value is based on an undefined black-box function of the first set of input values; and testing a sample that incorporates the second set of output values.

7. The computer program product of claim 6, wherein the first set of input values includes user defined constraints as side constraints.

8. The computer program product of claim 6, wherein the first set of input values is selected from the group consisting of continuous values, integer values, and categorical values.

9. The computer program product of claim 8, wherein the program instructions further comprise converting the first set of input values to the integer values and setting the categorical values to integer levels.

10. The computer program product of claim 6, wherein the output value is a discovery selected from the group consisting of a new chemical compound, a materials design, a fabrication design, a hyper-parameter tuning for a neural network, and a process design for a semiconductor device.

11. A computer server, comprising:

a network connection;

one or more computer readable storage media;

a processor coupled to the network connection and coupled to the one or more computer readable storage media; and program instructions collectively stored on the one or more computer readable storage media to cause the processor to perform operations comprising:

receiving historical data including a first set of input values and a first set of output values;

incorporating the received historical data into a sampling design to form an initial dataset comprising function values and continuous values;

normalizing the initial dataset;

training, based on the normalized initial dataset, a feedforward deep neural network with a softplus activation function to determine a solution point;

training a rectified linear activation function (ReLU) deep neural network using the determined solution point as an initial point;

generating a surrogate model of a machine learning model based on the training of the ReLU deep neural network;

applying one or more mixed-integer linear programming techniques to the surrogate model such that a second set of predicted input values is determined, the mixed-integer linear programming techniques including domain knowledge-based constraints;

testing the machine learning model, from which the surrogate model is generated, using the second set of predicted input values as input to the machine learning model such that, in response, the machine learning model generates a second set of output values, wherein the testing of the machine learning model comprises determining whether an output value, among the second set of output values, has been generated, and the output value is based on an undefined black-box function of the first set of input values; and testing a sample that incorporates the second set of output values.

12. The computer server of claim 11, wherein the first set of input values includes user defined constraints as side constraints.

13. The computer server of claim 11, wherein the first set of input values is selected from the group consisting of continuous values, integer values, and categorical values.

14. The computer server of claim 13, wherein the operations further comprise converting the first set of input values to the integer values and setting the categorical values to integer levels.

* * * * *